Jan. 2, 1951     A. L. NEWCOMB ET AL     2,536,998

SPRAY BOOTH

Filed Feb. 23, 1949

INVENTORS
Avon Lockhart Newcomb
Orrin Edward Fenn

Patented Jan. 2, 1951

2,536,998

UNITED STATES PATENT OFFICE 2,536,998

SPRAY BOOTH

Avon Lockhart Newcomb, Bloomfield Hills, and Orrin Edward Fenn, Grand Rapids, Mich., assignors to Newcomb-Detroit Company, Detroit, Mich., a corporation of Michigan Application February 23, 1949, Serial No. 77,902

2 Claims. (Cl. 183—8)

This invention relates to paint spraying booths provided with separators of the wet type in which water is used to effect the removal from air of paint-fog and droplets produced by paint atomizing means. This invention can also be used for the purification of air from other contaminants, such as dusts and fibrous particles from grinding and polishing means, and also deleterious gases which are soluble in water.

A primary object of this invention is to provide simple and inexpensive apparatus for arresting and separating all kinds of materials suspended in air.

Another object is to provide apparatus capable of functioning as described, which can be maintained in fully effective and satisfactory operating condition with reduced servicing and maintenance expense.

A further object of this invention is to cause more thorough mixing and intermingling of the air dealt with and the water used for its purification than is possible with apparatus used prior to this invention.

An additional object is to provide apparatus capable of greatly increasing the collisions between particles of various kinds suspended in air and droplets of water, as such collisions enhance air purification.

The advantages and meritorious features of this invention will be apparent from the following description, appended claims, and accompanying drawing wherein:

Figure 1:
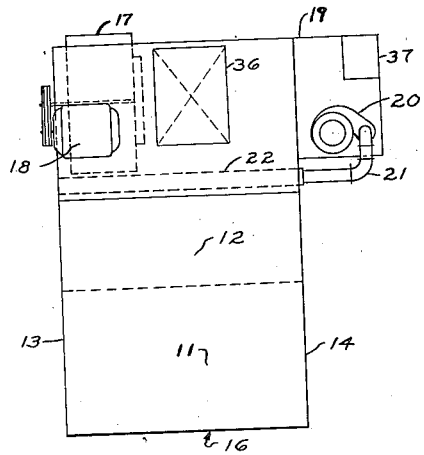
Figure 1 is a top plan view of a spray booth or work chamber provided with a wet type separator embodying this invention.

The apparatus shown in Figs. 1, 2, 3 and 4 may be considered representative of an embodiment of this invention. The device illustrated is particularly adapted to the removal of paint globules from air but modifications within the ambit of this invention can easily be made, suitable for the similar removal of other substances, chiefly by rearrangement of flow of air through conduits to the wet type separator in a manner well known to those skilled in the art.

In the drawing the numeral 11 designates a spray booth in which various articles are coated with atomized paint. This booth is enclosed by a top sheet 12, two sides 13 and 14, and the floor 15. Air enters the spray booth through its open end 16 from the circumambient atmosphere due to a rarefaction in pressure produced by the exhaust fan 17, driven by an electric motor 18.

Figure 4:
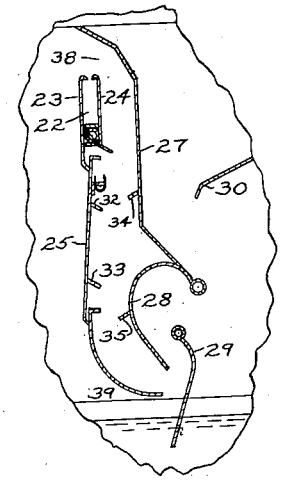
Fig. 4 is a fragmentary sectional elevation to an enlarged scale, also taken on the line 1—1 of Fig. 2, showing the paths taken by the air in its flow through the portion of the apparatus deliniated and the way in which two separate and distinct streams of air heavily laden with drops of water are impacted into each other transversely.
Figure 2:
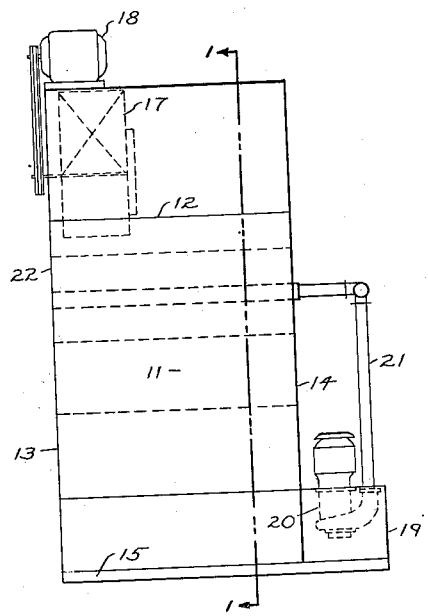
Fig. 2 is a front elevation looking into the open end of the spray booth through which air is drawn from the surrounding atmosphere.
Figure 3:
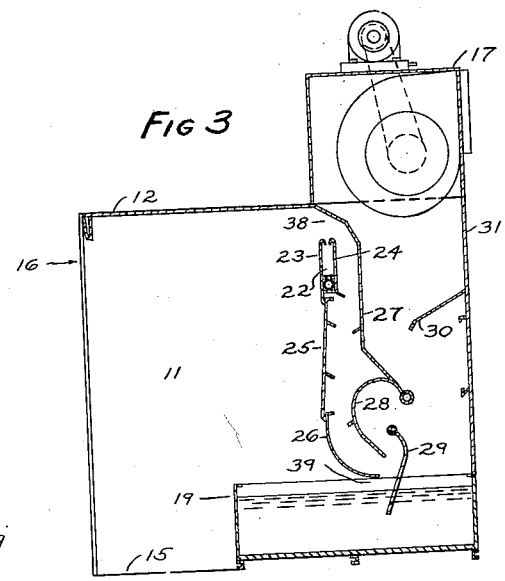
Fig. 3 is a vertical sectional elevation of the apparatus shown in Fig. 1 and Fig. 2, taken on the line 1—1 of Fig. 2.

In its passage through the spray booth the air receives atomized paint, lacquer, or enamel which has missed or rebounded from the surfaces towards which it was directed by a spray gun. A water tank 19 is provided extending from side to side of the spray booth, and also projecting outside the booth for the easy application of a motor pump unit 20. Within the tank 19 water is maintained at a suitable predetermined level by a float valve, not shown. The pump takes water from the tank 19 and delivers it through pipe 21 to a tank of relatively small capacity 22 which extends from side to side of the booth. As the pump is not required to atomize water and only elevates it a short vertical distance, it operates under low head and requires only a small amount of power. The water delivered to the tank 22 overflows and runs down its external front and back surfaces 23 and 24 respectively. The water flowing down the frontal surface forms a continuous sheet extending from side to side of the spray booth, and flows down over the surface of a sheet of metal 25 constituting a vertical partition, terminating at its lower end in a curved deflector sheet 26. Behind sheet 25 another partition 27 shaped as shown in Figs. 3 and 4 is provided. At the bottom of partition 27 another partition 28 is formed constituting a baffle, the top portion of which is curved through an angle of approximately 180 degrees, and terminating in a lowermost portion inclined at approximately 45 degrees to horizontal. Both upper and lowermost portions of partition 28 function as deflectors or baffles. A separately positioned substantially vertical baffle 29 is provided, shaped as shown in Figs. 3 and 4 and this extends downward below the surface of the water in the tank 19. Behind partition 27 a baffle plate 30 is furnished, inclined as shown in Fig. 3, and this is attached to the vertical sheet 31 which constitutes the rear wall of the entire spray booth and wet type separator. On the back of partition 25 short lips or projections are attached as shown by the numerals 32 and 33 as shown in Fig. 4, and similar lips 34 and 35 are attached to partitions 27 and 28 respectively. Access doors are denoted by the rectangles 36 and 37.

Approximately half the air withdrawn from the spray booth passes through the opening 38 which extends from side to side of the booth and enters the wet type separator. This air descends through the passage or conduit between partitions 25 and 27 and is subjected to the cleaning action of water overflowing from the back of the tank 22 and broken into drops as it rebounds from side to side of the passage from the lips 32, 33, 34 and 35. Turbulence of the descending air stream within the heavy cascade of water in this portion of the apparatus provides good cleaning effect. The remainder of the air taken from the spray booth passes through the opening 39 existing between the lower end of the deflector sheet 26 and the surface of the water in the tank 19. Water falls in multitudinous drops from the entire lower surface of the sheet 26 and the acceleration of the air stream at this point is such as to carry in suspension small and large drops sequentially; all of the former being so carried. The water laden air which passes through the opening 39 strikes the baffle 29 at an angle of approximately 90 degrees and flows upward.

At this point the upwardly flowing air receives the impact of the transversely directed water laden air stream which has descended between the partitions 25 and 27. The confliction between the two water laden transversely flowing high velocity air streams and the concomitant forceful collisions of drops of water and paint droplets are of paramount and critical importance. The cleaning action so produced is greatly superior to that caused by the random and fortuitous drop collisions within the air and water swirls of the apparatus used prior to this disclosure. The relative inefficiency of such prior devices is due to the fact that parallel flow occurs to a considerable extent within swirls and consequently collisions of drops are minimized by the cushioning effect of the air between them. Also the water projected from the curved sheets which produce the swirls remains in relatively large masses which have little cleaning effect.

After turbulently mixing, the confluent air streams pass upward along the back of the partition 28 from which they are projected downward at a steep angle and most of the coalesced drops of water and paint are thrown violently into the tank 19 and remain in the water in same. The air is then forced to reverse its direction of flow, during which action much turbulence and multitudinous drop collisions are produced, and pass upward between the end of the partition 28 and the back wall 31 of the wet type separator. The air next encounters the baffle plate 30 which traps out the remaining drops of mixed paint and water, and then flows to the exhaust fan 17 from which it is usually discharged outdoors, because of its content of insoluble evaporated paint or lacquer solvents.

The embodiment herein disclosed is merely illustrative and modifications may be made in various ways without departing from the essence and scope of our invention.

Having described our invention, what we claim and desire to secure by Letters Patent of the United States is:

1. In a ventilated spray booth in combination with a wet type separator, a tank at the floor of said spray booth and said separator containing water, a partition extending from within a short distance from the top of said spray booth to within a short distance from the surface of water in said tank thereby forming upper and lower openings for the flow of a first stream of air above said partition and the flow of a second stream of air below said partition, a conduit for the first mentioned air stream positioned adjacent to said partition extending downwardly from said upper opening to a point near said lower opening, a second tank positioned adjacent to the top of said partition adapted to supply water in the form of a descending sheet over the frontal surface of said partition and also to said conduit to form a cascade of water therein, whereby the first mentioned air stream copiously laden with drops of water from said cascade and the second mentioned air stream heavily charged with drops of water which fall from the bottom of said partition are separately projected horizontally, a baffle substantially perpendicular to the flow of said projected air streams on the frontal surface of which said baffle said air streams are merged and mixed and the said baffle diverting the said merged air streams upwardly, further baffle means above said first named baffle for removing entrained drops and particles from said confluent air streams, a pump for circulating water, and a fan for drawing contaminated air from said booth, through said openings and said conduit, and past said baffles.

2. In a ventilated spray booth in combination with a wet type separator as claimed in claim 1, an approximately vertical baffle which also serves as a target positioned to oppose the flow of two contiguous substantially horizontal air streams carrying drops of water and contaminants in suspension, whereby one of said air streams is deflected by said baffle through an angle of approximately 90 degrees and then is joined by the other horizontally flowing air stream which is also deflected by said baffle, thereby causing some of the said drops of water and the said contaminants to be projected against the said baffle because of their inertia and other of said drops of water and said contaminants to forcefully collide with each other.

AVON LOCKHART NEWCOMB.
ORRIN EDWARD FENN.

REFERENCES CITED

The following references are of record in the file of this patent:

UNITED STATES PATENTS

| Number | Name | Date |
|---|---|---|
| 836,826 | Pettit | Nov. 27, 1906 |
| 968,332 | Dow | Aug. 23, 1910 |
| 1,842,663 | Ellis | Jan. 16, 1932 |
| 2,119,207 | Gibbs | May 31, 1938 |